United States Patent [19]

Oberth et al.

[11] 3,919,011

[45] Nov. 11, 1975

[54] SOLID PROPELLANT COMPOSITION WITH A POLYURETHANE BINDER

[75] Inventors: Adolf F. Oberth, Fair Oaks; Rolf S. Bruenner, Orangevale, both of Calif.

[73] Assignee: Aerojet-General Corporation, El Monte, Calif.

[22] Filed: Jan. 10, 1969

[21] Appl. No.: 791,540

[52] U.S. Cl. ............... 149/19.4; 149/42; 149/76
[51] Int. Cl.² ..................................... C06B 45/10
[58] Field of Search ............ 149/19, 20, 76, 42, 44, 149/19.4

[56] References Cited
UNITED STATES PATENTS

| | | | |
|---|---|---|---|
| 3,117,898 | 1/1964 | Hedrick et al. | 149/42 X |
| 3,245,850 | 4/1966 | Harbert | 149/42 X |
| 3,350,245 | 10/1967 | Dickinson | 149/42 X |
| 3,462,952 | 8/1969 | D'Alelio | 149/44 X |

*Primary Examiner*—Stephen J. Lechert, Jr.
*Attorney, Agent, or Firm*—Edward O. Ansell

[57] ABSTRACT

This patent describes a novel solid rocket propellant formulation containing a polyurethane binder and a solid oxidizing salt; the improvement wherein the amount of isocyanate groups present in the polyurethane is at least slightly in stoichiometric excess of the total amount of active hydrogen groups present, and said excess of isocyanate groups is subsequently reacted in the cure with an additive selected from the group consisting of metal hydroxides which are water donor and carbon dioxide acceptors under cure conditions, metal chelates which liberate diamine or alkanolamine under cure conditions, and polyurethane slightly soluble diols.

12 Claims, No Drawings

3,919,011

SOLID PROPELLANT COMPOSITION WITH A POLYURETHANE BINDER

BACKGROUND OF THE INVENTION

Modern high performance propellants require a very high solids loading to meet the specified thrust. Obviously, the quantity of binder has to be reduced in order to make this possible. This has two disadvantages: (1) the mechanical properties, necessary to give the propellant grain the ability to withstand temperature changes, or sudden shocks, etc., suffers, and (2) the reproducibility or batch-to-batch variability is adversely affected. It is particularly the second problem which has plagued the art and the present invention is directed to a practical solution to this problem as well as to the first problem described above.

The reproducibility problem can be easily demonstrated. In many known polyurethane propellant formulations, the isocyanate concentration of the batch is about 1.2%. The surface moisture and other side reactions normally consume about 0.05 to about 0.1% of the isocyanate, which is normally from 4 to about 8% of the total isocyanate content. In the newest and more highly loaded polyurethane propellants, the amount of diisocyanate has shrunk to approximately 0.7% per propellants employing polyether binder systems, and down to 0.3% for propellants using hydroxy-terminated polybutadiene prepolymers. If 0.05 to 0.1% of the isocyanate is consumed by side reactions, the resultant effect on the binder cure is much more serious, and results in poor reproducibility as well as a high scrap rate. This situation cannot be solved by the mere addition of more isocyanate primarily because the extent of side reactions cannot be accurately predicted, and the presence of excess isocyanate results in the so-called soft-center cure, that is, the propellant remains liquid underneath a hard crust which is caused by the reaction of excess isocyanate groups with atmospheric moisture. Eventually, such a propellant grain might cure completely but, depending on the web thickness, this may require months or years for the required moisture to diffuse into the center of the grain to complete the cure. The present invention represents a wholly new approach to this problem, and has been found to effectively and simply solve it.

SUMMARY OF THE INVENTION

Briefly, this invention comprises a novel solid rocket propellant formulation containing a polyurethane binder and a solid oxidizing salt; the improvement wherein the amount of isocyanate groups present in the polyurethane is at least slightly in stoichiometric excess of the total amount of active hydrogen groups present, and said excess of isocyanate groups is subsequently reacted in the cure with an additive selected from the group consisting of metal hydroxides which are water donor and carbon dioxide acceptors under cure conditions, metal chelates which liberate diamine or alkanolamine under cure conditions, and polyurethane slightly soluble diols. This invention also comprehends the process of preparing a solid rocket propellant which comprises reacting in the presence of a solid oxidizing salt one or more organic active hydrogen compounds with a stoichiometric excess of polyfunctional organic isocyanate to form a polyurethane polymer containing free NCO-groups, and subsequently reacting said NCO-groups with an additive selected from the group consisting of metal hydroxides which are water donor and carbon dioxide acceptors under cure conditions, metal chelates which liberate diamine or alkanolamine under cure conditions, and polyurethane slightly soluble diols to form a propellant essentially free of unreacted isocyanate groups.

In principle, the present invention involves the use of a sufficient excess of isocyanate to take care of even the worst anticipated deviations from cure stoichiometry. This normally will result in propellant batches in which the alcoholic prepolymers are terminated by isocyanate groups, the extent of isocyanate termination being essentially dependent upon the excess of the diisocyanate used. The formulation also contains an additive which is a preferentially difunctional compound. The additive is used in a quantity at least sufficient to react with all the excess isocyanate, and thereby link the dangling polymer chain ends together. The difunctional additive of this invention acts in such a way that regardless of its quantity, one molecule of it is always consumed to link two isocyanate groups together. The additive is also available for substantial reaction with isocyanate groups only after the bulk of the polyurethane reaction has occurred. The above-identified compounds are essentially hindered from immediate isocyanate reaction either by being chemically bonded during the initial phases of the cure cycle, or as a result of the slight solubility in polyurethanes.

It will be seen that many difunctional compounds cannot function as additives in this way. For example, an ordinary diol would require that the stoichiometric quantity needed to react with the isocyanate not be exceeded because, otherwise isocyanate termination would only be exchanged for hydroxy termination and there would be no advantage. Likewise, water does not satisfy the conditions above-described. One molecule of water reacts slowly with one isocyanate group to form eventually an amine plus carbon dioxide. The amine then reacts very fast with the second isocyanate group to give an urea linkage. Thus, in essence one mole of water reacts with two isocyanate groups. However, water is not suitable for this invention because it reacts too fast compared to the polyether diols and therefore the second requirement; namely, that first all hydroxy components constituting the bulk of the polyurethane backbone must have been reacted by the isocyanate before the additive compound begins to react is not fulfilled. Another disadvantage of plain water is the evolution of carbon dioxide which produces bubbles and/or cracks in the finally cured propellants.

It is an object of the present invention to provide a novel means for the elimination of unreacted isocyanate groups in polyurethane propellants.

More particularly, it is an object of the present invention to provide an approved polyurethane propellant grain having ability to withstand temperature changes and sudden shocks.

Still another object of the present invention is to provide a polyurethane propellant formulation having a high degree of reproducibility from batch-to-batch.

These and other objects and advantages of the present invention will be apparent from the more detailed description which follows.

DESCRIPTION OF PREFERRED EMBODIMENTS

One class of suitable additives are the metal hydroxides which are both a water donor and $CO_2$-acceptor.

For example: Ni(OH)$_2$ + 2RNCO → NiCO$_3$ + RNH—CO—NHR. It is well known that different metal hydroxides hold the water bound with varying tenacity so that by chosing different hydroxides, those skilled in the art can at will regulate the potlife of the propellant. The best results are obtained with Ni(OH)$_2$ and MnO(OH). Other hydroxides such as Zn(OH)$_2$, BiO(OH) and Mg(OH)$_2$ are also useful, the latter requiring a rather high cure temperature. The water can be delivered by any hydrate of appropriate decomposition temperature and any suitable CO$_2$-acceptor. A few of the suitable compounds are listed herewith: Mg$_3$(PO$_4$)$_2$.3H$_2$O — Mg(OH)$_2$; Ca SO$_4$.2H$_2$O — Mg(OH)$_2$; and Mg$_3$(AsO$_4$)$_2$.6H$_2$O — Cd(OH)$_2$. Thus, it can be seen that the water donor and CO$_2$-acceptor functions can be provided in a single compound such as Ni(OH)$_2$ or by the use of a mixture of a hydrate salt with a CO$_2$-accepting (carbonate forming) salt.

Tris(ethylenediamine) nickel chloride and other such chelates form another suitable group of compounds. Their advantage over the water donor cure is the absence of gaseous side products which obviates the need for a CO$_2$-acceptor. Their disadvantage is an inherently high reactivity of the chelate so that a large excess of such compounds may somewhat aggravate aging in case of the less stable metal chelates like [Cd en$_2$]Cl$_2$ (en = ethylenediamine). While not bound by any theory, it is believed that the principle which makes these compounds useful is that the chelate ring is much more stable than a simple coordinative bond. Hence, once the chelate ring is broken at one point the whole ligand becomes available for the isocyanate reaction rather than just one function of the chelating agent, the other function remaining firmly anchored to the central atom. The essential property of the chelate is the ability to begin to liberate a diamine or alkanolamine after the polyurethane reaction has gone substantially to completion. Based on this disclosure, those skilled in the art will be able to select many other chelates which are suitable in the practice of this invention.

The additive may also be a slightly polyurethane soluble diol which is used to hook together any surplus NCO-groups. If the concentration of this diol in solution in the binder phase is kept small compared to the concentration of the unreacted NCO-groups it is possible to react both hydroxyl-functions of the diol without obtaining chain termination. One has only to select a diol of the required degree of insolubility. Good results have been obtained with quaternary ammonium diol compounds.

The following examples are presented solely to illustrate the invention.

EXAMPLE I

The propellant composition used for testing is given below:

| | |
|---|---|
| Ammonium perchlorate | 70% |
| Aluminum powder | 15% |
| Copper chromite | 0.05% |
| Sulfur | 0.05% |
| Phenyl-naphthylamine | 0.05% |
| Isodecylpelargonate | |
| poly(1,2 oxypropylene) triol approx. eq. wt. 1300 | |
| poly(1,2 oxybutylene) diol approx. eq. wt. 1000 | 14.35% |
| Acrylonitrile adduct to tetraethylene pentamine eq. wt. 200 | |
| hexamethylene diisocyanate | |
| Curing aid | 0.05 – 0.5% |

The amount of HDI was 20 mole % excess over the stoichiometric quantity.

Table 1

| WATER DONOR AND CO$_2$-ACCEPTOR | | | |
|---|---|---|---|
| Level % | σ, psi | ε, % | E$_u$, psi |
| Ni(OH)$_2$ 0.5 | 230 | 45 | 1250 |
| MnO(OH) 0.125 | 240 | 50 | 1300 |
| MnO(OH) 0.25 | 235 | 45 | 1250 |
| MnO(OH) 1.25 | 230 | 48 | 1350 |

EXAMPLE II

Chelate-type curing aids in the propellant formulation of Example I.

| | Level % | σ, psi | ε, % | E$_u$, psi |
|---|---|---|---|---|
| [Cd(H$_2$NCH$_2$CH$_2$NH$_2$)$_2$]Cl$_2$ | 0.5 | 160 | 50 | 700 |
| [Ni(H$_2$NCH$_2$CH$_2$NH$_2$)$_3$]Cl$_2$ | 0.5 | 131 | 60 | 500 |
| [Cu(H$_2$NCH$_2$CH$_2$OH)$_2$]Cl$_2$ | 0.5 | 150 | 63 | 650 |

EXAMPLE III

The results in the propellant system of Example I are shown in the following table:

| INSOLUBLE DIOL CURING AIDS | | | | | |
|---|---|---|---|---|---|
| Compound | Level Used | Cure Time at 135°, days | σ, psi | ε, % | E$_u$, psi |
| [NCCH$_2$CH$_2$N(CH$_3$)$_2$((CH$_2$CH$_2$OH)$_2$]$^+$H$_3$CC$_6$H$_4$SO$_3^-$ | 0.25 | 2 | 163 | 61 | 715 |
| [(CH$_3$)$_2$N(CH$_2$CH$_2$OH)$_2$]$^+$H$_3$CC$_6$H$_4$SO$_3^-$ | 0.25 | 4 | 220 | 60 | 1000 |
| [(CH$_3$)$_3$NCH$_2$CHOHCH$_2$OH]$^+$H$_3$CSO$_3^-$ | 0.25 | 5 | 214 | 54 | 978 |
| [(CH$_3$)$_3$NCH$_2$CHOHCH$_2$OH]$^+$I$^-$ | 0.25 | 7 | 153 | 60 | 737 |

The following table shows other slightly soluble diols, their formula and performance in above formulation follows:

Table 2

|  | Level Used | 135°F Cure Time Days | σ | ε | $E_o$ |
|---|---|---|---|---|---|
| $CH_2CH_2CH_2SO_3^-$<br>    \|<br>$(CH_3)_2$-N CH$_2$CHOHCH$_2$OH | 0.25 | 14 | 182 | 63 | 850 |
| (+)<br>$(HOCH_2CH_2)_3$ N CH$_2$CH$_2$CH$_2$SO$_3^-$ | 0.25 | 14 | 162 | 58 | 711 |
| $[(CH_3)_2N(CH_2CH_2OH)_2]^+CH_3SO_4^-$ | 0.25 | 2 | 111 | 75 | 450 |
| $[(CH_3)C_2H_5N(CH_2CH_2OH)_2]^+C_2H_5SO_4^-$ | 0.25 | 1 | 75 | 93 | 381 |
| $CH_2$—CHOH—$CH_2OH$<br>   \|<br>$(C_4H_9)_2$ N[CH$_2$CH$_2$CH$_2$—SO$_3$]$^-$ |  | 14 | 175 | 59 | 751 |
| $[CH_3(C_2H_5)N(CH_2 CH_2OH)_2]^+I^-$ |  | 14 | 145 | 73 | 620 |

EXAMPLE IV

The composition for the polybutadiene propellant system used for testing is as follows:

| | |
|---|---|
| Ammonium perchlorate | 73% |
| Aluminum powder | 15% |
| Dioctylsebacate (plasticizer) | 3.90% |
| polybutadiene diol (6000 MW) (Phillips Petroleum Co.) | 7.17% |
| polypropylene oxide triol (700 MW) | 0.30% |
| dihydroxypropyl bis(cyanoethylamine) | 0.05% |
| FeAA | 0.02% |
| Additive | 0.15% |
| Toluene diisocyanate | 0.41% |

The above formulation contained 20 mole percent excess isocyanate and would not cure without additive. With 0.15% of the following additives (which is more than stoichiometric quantity) the above formulation cured and gave the following properties:

Table 3

|  | Level | Days of 135°F Cure Time | σ | ε | E |
|---|---|---|---|---|---|
| $[Ni(H_2NCH_2CH_2NH_2)_3]Cl_2$ | 0.15 | 10 | 86 | 46 | 330 |
| MnO(OH) | 0.15 | 10 | 98 | 91 | 391 |
| Ni(OH)$_2$ | 0.15 | 10 | 90 | 38 | 400 |

Freshly prepared Mg(OH)$_2$ was found suitable at high cure temperature (180°F for 14 days).

EXAMPLE V

| | |
|---|---|
| Ammonium perchlorate | 73% |
| Aluminum powder | 15% |
| Isodecylpelargonate | 3% |
| Polybutadiene polyol (B. F. Goodrich) | 8.01% |
| Glycidol adduct to tetraethylene pentamine | 0.25% |
| Mg(OH)$_2$ | 0.20% |
| Toluene diisocyanate | 0.54% |

The isocyanate constituted 20% excess. In a very similar formulation the glycidol adduct to tetraethylene pentamine was replaced by an equal amount of a cyanoethylated tetraethylene pentamine.

Table 4

|  | σ, psi | ε, % | $E_o$, psi |
|---|---|---|---|
| Acrylonitrile adduct | 308 | 33 | 2500 |

Table 4-continued

|  | σ, psi | ε, % | $E_o$, psi |
|---|---|---|---|
| Glycidol adduct | 115 | 28 | 2000 |

The general types of polyurethane systems, oxidizing agents, and other additives, as well as their proportions, formulation and curing conditions, all of which pertain to the present invention, are disclosed in detail in U.S. Pat. No. 3,340,111, issued Sept. 5, 1967, the disclosure of which is expressly incorporated herein by reference.

Having fully defined the invention it is intended that it be limited only by the lawful scope of the appended claims.

1. A novel solid propellant formulation containing a polyurethane binder and a solid oxidizing salt, wherein, the polyurethane binder comprises the reaction product of an NCO-terminated urethane prepolymer with an additive selected from the group consisting of metal hydroxides which are water donors and carbon dioxide acceptors under cure conditions, metal chelates which liberate diamine or alkanolamine under cure conditions and quaternary ammonium diols.

2. The formulation of claim 1 wherein the additive is Ni(OH)$_2$.

3. The formulation of claim 1 wherein the additive is MnO(OH).

4. The formulation of claim 1 wherein the additive is tris(ethylenediamine) nickel chloride.

5. The formulation of claim 1 wherein the additive is bis(ethylenediamine) cadmium chloride.

6. The formulation of claim 1 wherein the additive is bis(ethanolamine) copper chloride.

7. The process of preparing a solid rocket propellant which comprises reacting in the presence of a solid oxidizing salt one or more organic active hydrogen compounds with a stoichiometric excess of polyfunctional organic isocyanate to form a polyurethane polymer containing free NCO-groups, and subsequently reacting said NCO-groups with an additive selected from the group consisting of metal hydroxides which are water donor and carbon dioxide acceptors under cure conditions, metal chelates which liberate diamine or alkanolamine under cure conditions, and polyurethane slightly soluble diols to form a propellant essentially free of unreacted isocyanate groups.

8. The process of claim 1 wherein the additive is Ni(OH)$_2$.

9. The process of claim 1 wherein the additive is MnO(OH).

10. The process of claim 1 wherein the additive is tris(ethylenediamine) nickel chloride.

11. The process of claim 1 wherein the additive is bis-(ethylenediamine) cadmium chloride.

12. The process of claim 1 wherein the additive is bis-(ethanolamine) copper chloride.

* * * * *